United States Patent [19]

Vandendriessche

[11] Patent Number: 5,233,755
[45] Date of Patent: Aug. 10, 1993

[54] METHOD OF MANUFACTURING THE WALL OF A COMBUSTION CHAMBER, IN PARTICULAR FOR A ROCKET ENGINE, AND A COMBUSTION CHAMBER OBTAINED BY THE METHOD

[75] Inventor: Georges Vandendriessche, Vernon, France

[73] Assignee: Societe Europeenne de Propulsion, Suresnes, France

[21] Appl. No.: 795,833

[22] Filed: Nov. 21, 1991

[30] Foreign Application Priority Data

Nov. 30, 1990 [FR] France .................. 90 15073

[51] Int. Cl.$^5$ ........................................... B23P 15/00
[52] U.S. Cl. .................... 29/890.01; 60/222
[58] Field of Search .................. 29/890.01, 527.1; 60/35.6

[56] References Cited

U.S. PATENT DOCUMENTS

| | | | |
|---|---|---|---|
| 2,892,253 | 6/1959 | Hutchins et al. | 29/890.01 |
| 2,968,918 | 1/1961 | Denison, Jr. | 60/35.6 |
| 3,182,448 | 5/1965 | Rabe | 60/35.6 |
| 3,208,132 | 9/1965 | Escher | 29/890.01 |
| 3,235,947 | 2/1966 | Sohlemann | 29/890.01 |
| 3,254,395 | 6/1966 | Baehr | 29/890.01 |
| 3,289,943 | 12/1966 | Thomas | 239/127.1 |
| 3,460,759 | 8/1969 | Gregory | 239/127.1 |
| 3,729,793 | 5/1973 | Schmidt et al. | 29/890.01 |
| 3,835,644 | 9/1974 | Butter et al. | 29/890.01 |

FOREIGN PATENT DOCUMENTS

| | | |
|---|---|---|
| 2015024 | 10/1971 | Fed. Rep. of Germany . |
| 0937695 | 9/1963 | United Kingdom ............. 29/890.01 |
| 2196391 | 4/1988 | United Kingdom . |

OTHER PUBLICATIONS

"Evaluation of Cold Isostatic Pressing of High-Pressure Thrust Chamber Closeout" Journal of Propulsion and Power vol. 2, No. 1, Feb. 2, 1986, New York, pp. 25–30; Niinok, Kumakawa, Watanabe.

*Primary Examiner*—Irene Cuda
*Attorney, Agent, or Firm*—Weingarten, Schurgin, Gagnebin & Hayes

[57] ABSTRACT

The method of manufacturing a combustion chamber wall, in particular for a rocket engine, includes the following steps:

[a] making a corrugated metal inner shell by deforming a first plane or tubular sheet;

[b] making a metal outer shell from a second plane or tubular sheet;

[c] assembling the corrugated inner shell and the outer shell together and welding them together locally;

[d] forming an inner coating on the inside face of the corrugated inner shell by the technique of powder metallurgy using a container for the material that is to constitute the inner coating, the outside face of said container being constituted directly by the inside face of said corrugated inner shell and the inside face of said container being made using removable non-consumable sections or a soluble core that is removed by selective chemical dissolving after the inner coating has been formed by applying a hot isostatic compacting cycle; and

[e] forming an outer coating on the outside face of the outer shell.

21 Claims, 7 Drawing Sheets

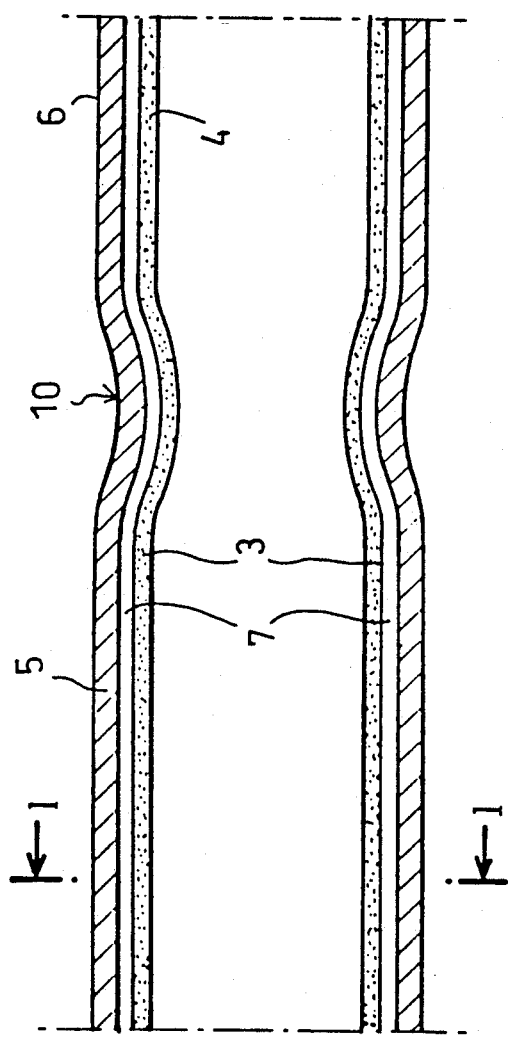
fig_1
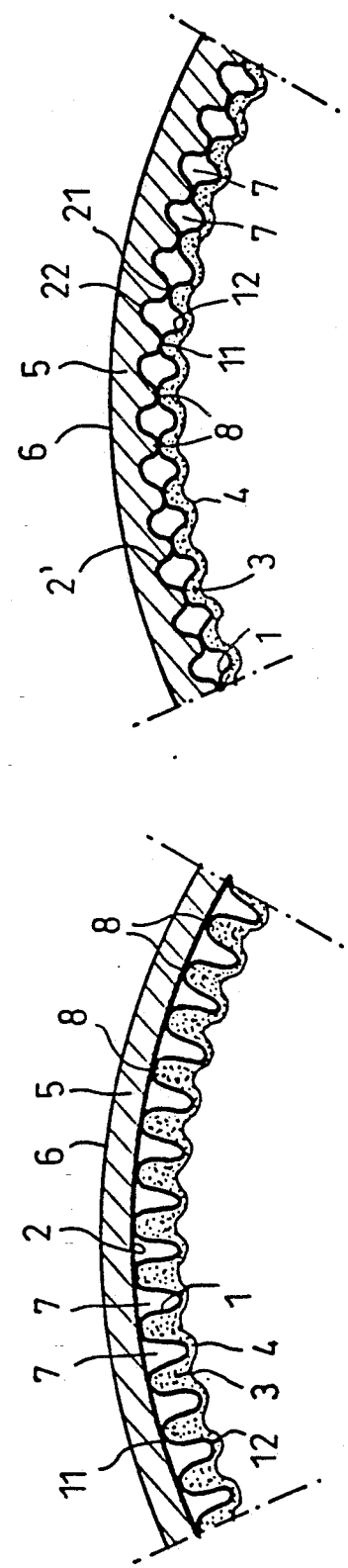
fig_2
fig_3

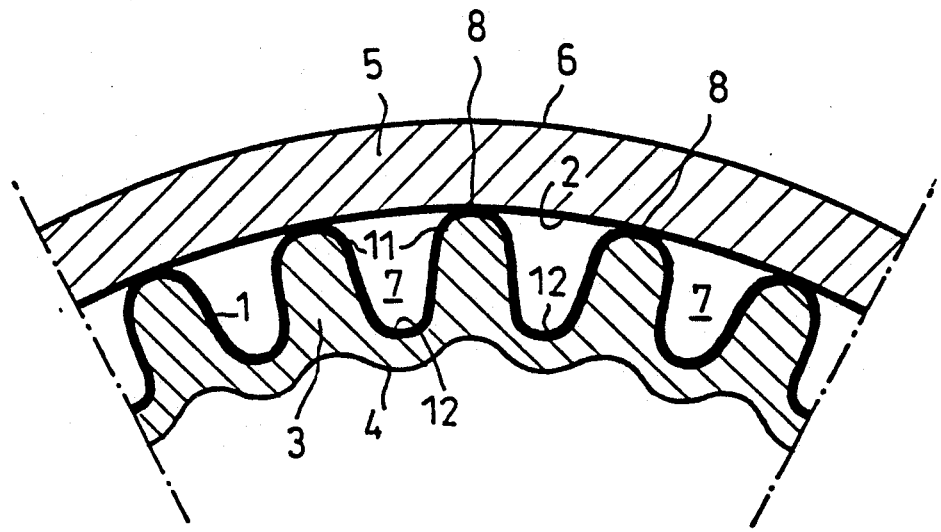
fig_4
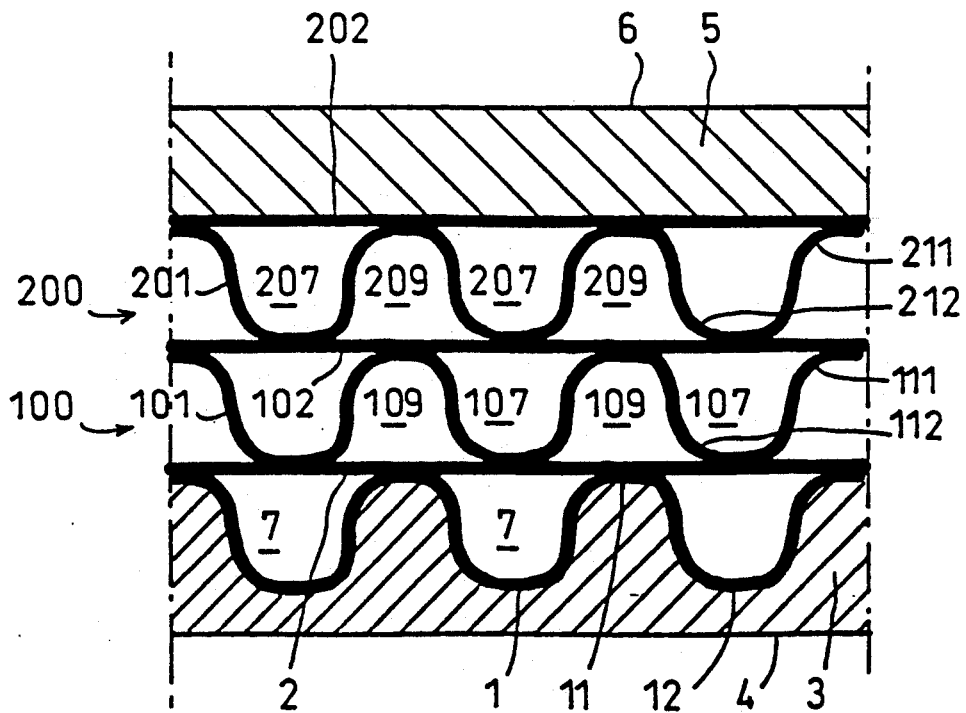
fig_6

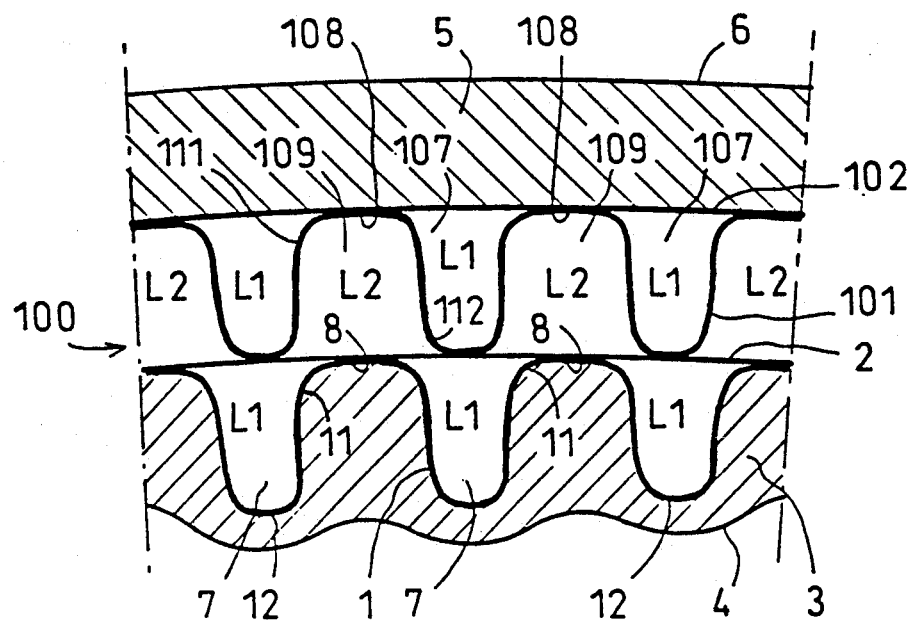
fig_5
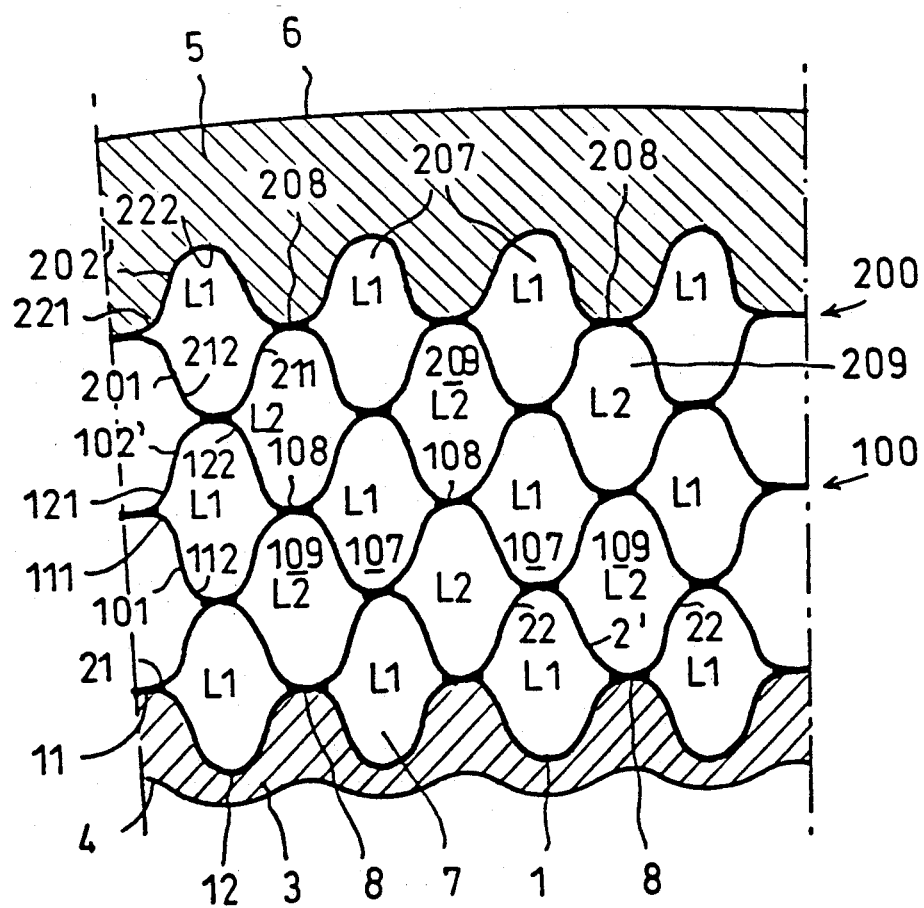
fig_7

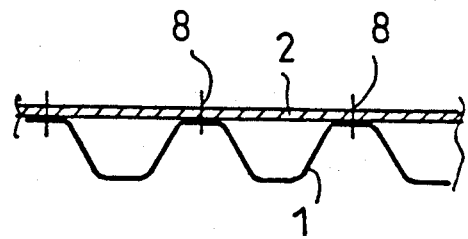
fig_8
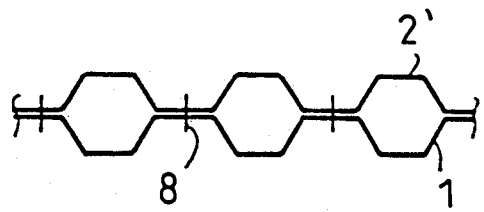
fig_9
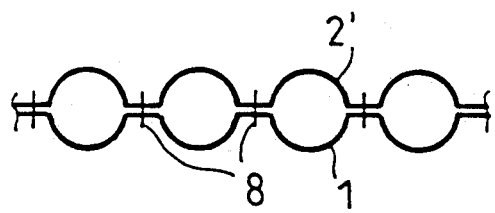
fig_10
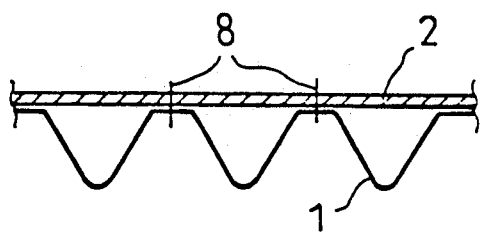
fig_11
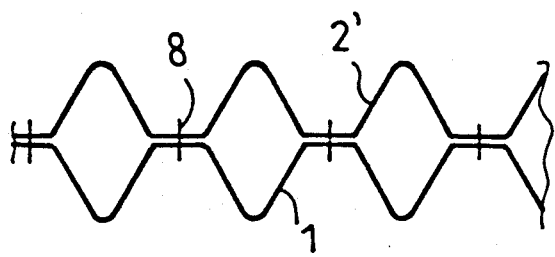
fig_12
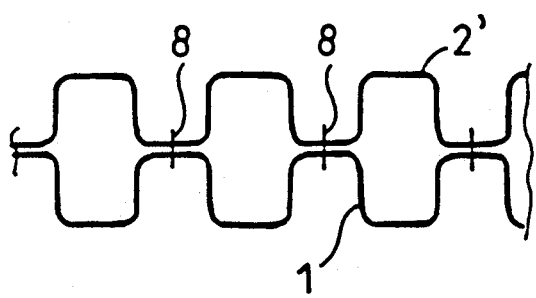
fig_13

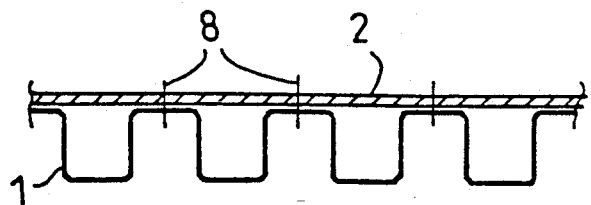
fig_14
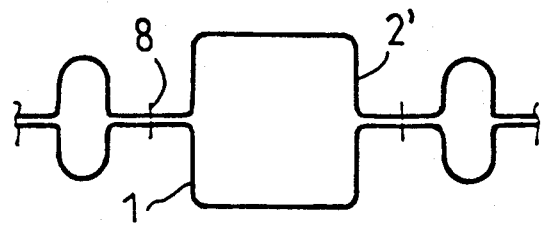
fig_15
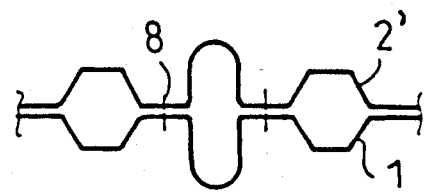
fig_16
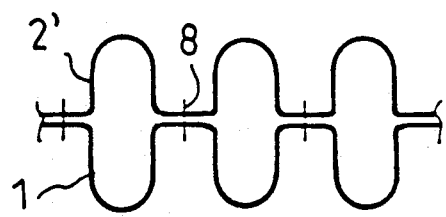
fig_17
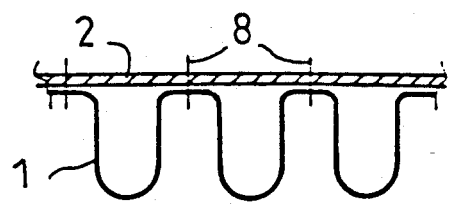
fig_18
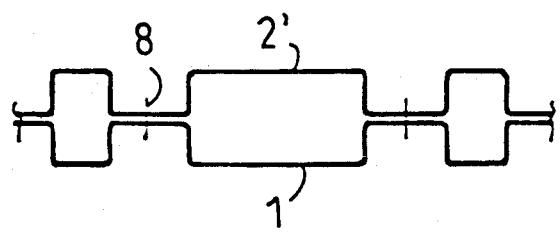
fig_19
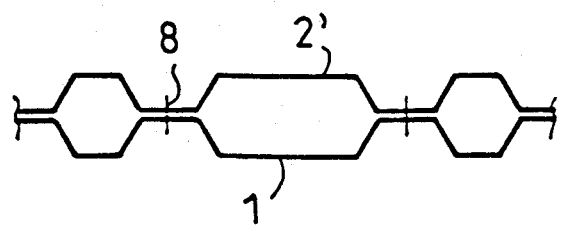
fig_20

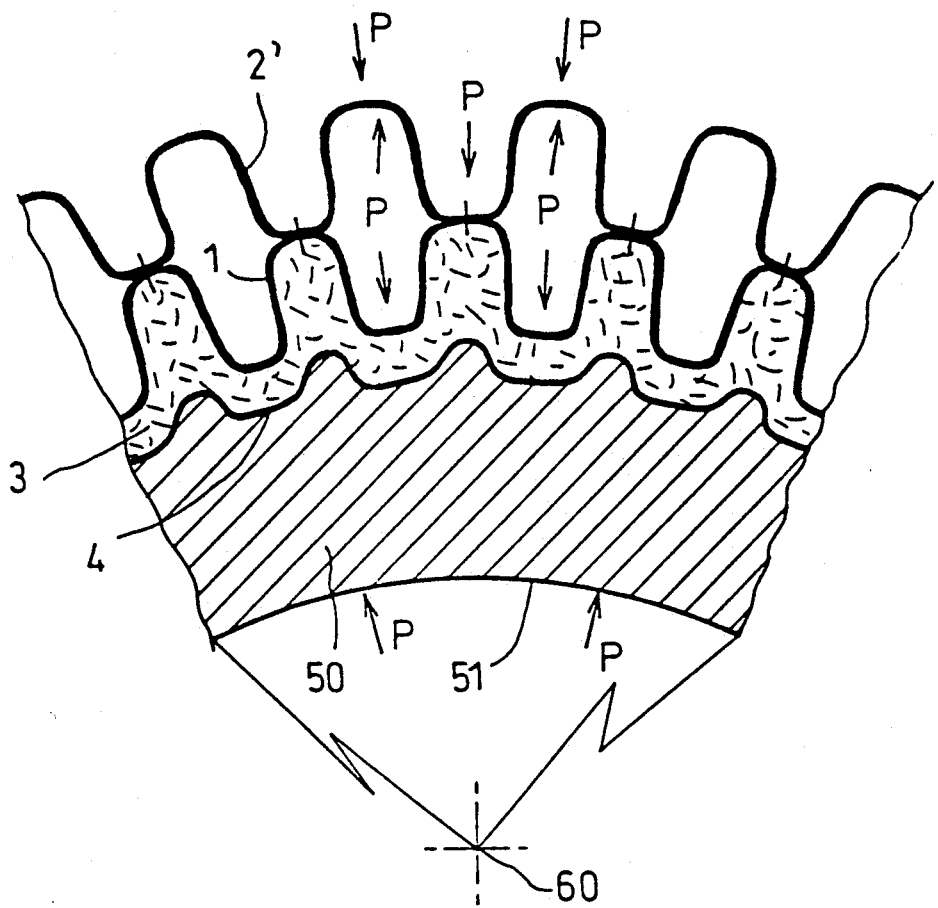
fig_21

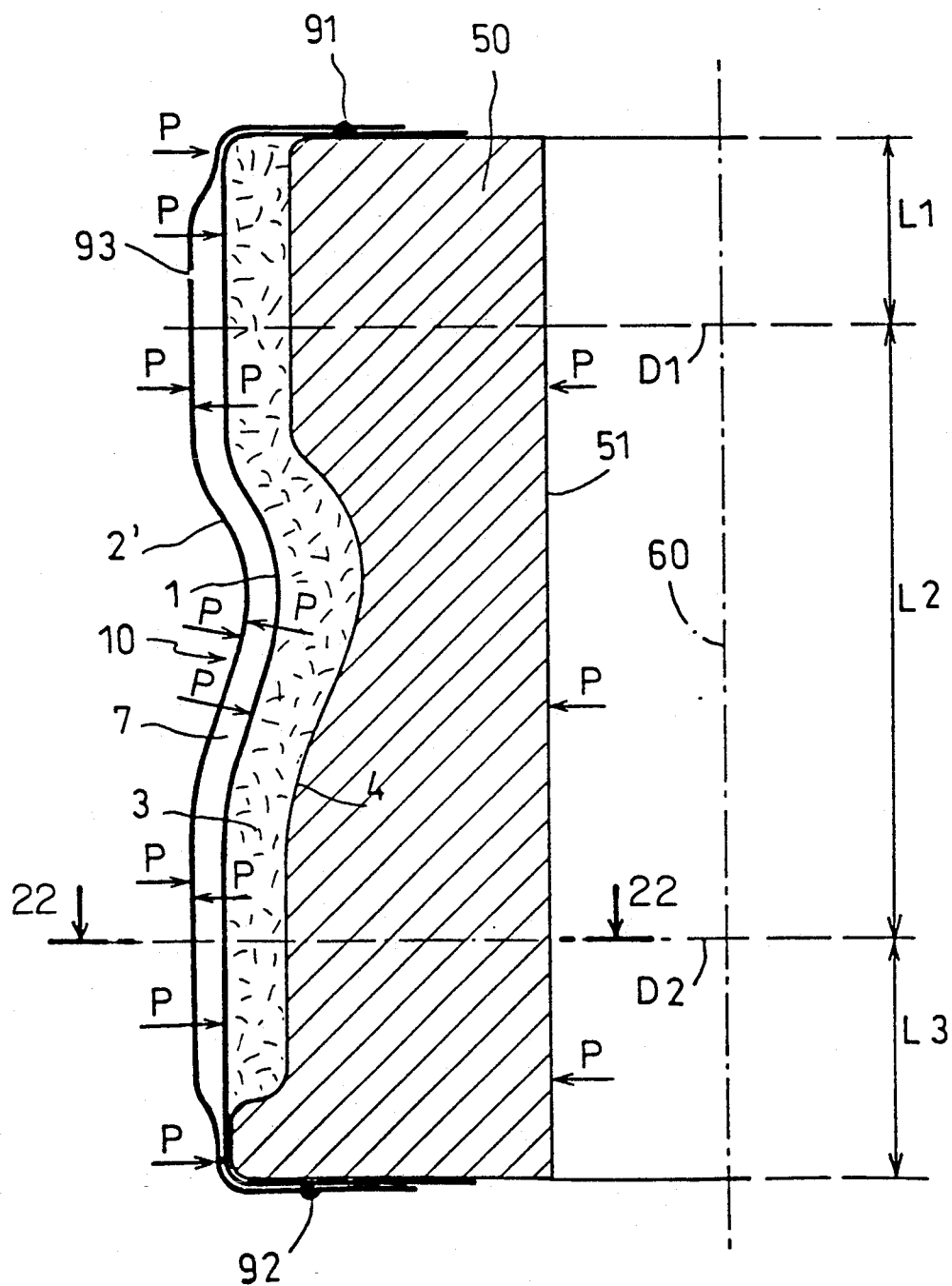
fig_22

METHOD OF MANUFACTURING THE WALL OF A COMBUSTION CHAMBER, IN PARTICULAR FOR A ROCKET ENGINE, AND A COMBUSTION CHAMBER OBTAINED BY THE METHOD

FIELD OF THE INVENTION

The present invention relates to a method of manufacturing a combustion chamber wall having essentially longitudinal channels, in particular for a rocket engine, in which first and second metal sheets are assembled together and welded together and are shaped so as to present corrugations between weld fillets so as to provide passages for a cooling fluid or a heating fluid.

The walls of combustion enclosures such as the combustion chambers and the nozzles of rocket engines, in particular liquid fuel engines, are generally cooled throughout operation whenever they are in contact with a high temperature environment.

One common method of cooling consists in providing the walls of such enclosures with cooling channels. This applies to satellite launchers and to space aircraft, and also to satellite propulsion units, to nuclear reactors, and to high efficiency boilers, and may also apply to the heat shields or nose cones of vehicles that fly at great speed.

Proposals have thus been made, in particular with respect to rocket engines, for various methods of manufacturing the walls of combustion chambers enabling longitudinally directed cooling channels to be integrated therein, with a coolant flowing therethrough that may be constituted by one of the fuel components being fed to the rocket engine, the cooling system then being said to be a regenerative system.

However the techniques for manufacturing such combustion chambers are difficult to implement, lengthy, and expensive.

In certain particular applications, it is also useful to be able to heat a cold enclosure by causing a hot fluid to flow through passages provided between first and second sheets constituting the walls of the enclosure.

PRIOR ART

In a first technique of manufacturing combustion chambers that are cooled by regeneration for liquid fuel rocket engines, the cooling channels are machined in an inside base body formed as a single piece in a metallic material that conducts heat well, such as copper. The cooling channels are thus separated from one another by partitions in the base body and an external cover is formed by electroplating of multiple layers of nickel alternating with essential machining passes between each electroplating pass. Prior to electroplating, the channels are closed by applying a conductive resin.

Such a manufacturing technique is lengthy and expensive, in particular because of the need to machine the channels.

In a variant, the channels may be closed by means of quartz or of ceramics instead of using the conductive resin. The channel filler material can then be dissolved by selective chemical dissolution. Such a technique is tricky and difficult to implement because of the fragility of quartz.

In another known technique for manufacturing combustion chambers or combustion chamber components for rocket engines, the cooling systems are constituted by calibrated individual tubes that are shaped and assembled by welding or brazing, and which thus constitute the wall itself of the chamber with its mechanical strength being reinforced by circumferential banding.

Such a technique also turns out to be lengthy and complex given the large number of individual parts to be assembled, and it does not provide great flexibility in the choice of characteristics for the tubes defining the cooling channels.

Document U.S. Pat. No. 3,249,989 discloses a method of making double-walled combustion chambers from metal sheets that are welded together and then deformed in their non-welded portions to define channels for coolant flow. However, deforming prewelded assemblies of metal sheets by blowing does not make it possible to obtain cooling channels of optimized shape and size, and the assemblies proposed in the above-specified document cannot be adapted to combustion chambers of small size.

Document U.S. Pat. No. 3,235,947 also discloses a method of manufacturing a combustion chamber from a set of two nested tubular components for forming a double-walled combustion chamber. In that case, axial ribs or corrugations are formed on at least one of the tubular components so as to come into contact with the other tubular component when the two tubular components are nested, and these tubular components are assembled together by welding along the ribs or corrugations. The channels are then formed by injecting a fluid under pressure into the empty passages between the axial weld fillets. In that case also, final shaping of the cooling channels after welding the two nested tubular components together prevents optimized configurations being made, in particular with respect to the shape or changing section of the channels as a function of axial position along the combustion chamber.

OBJECT AND BRIEF SUMMARY OF THE INVENTION

An object of the invention is to remedy the above-specified drawbacks and to enable a combustion chamber wall to be manufactured more quickly, more simply, and more cheaply than when implementing prior art methods, while also providing greater flexibility in choosing the nature of the materials used and the shape and sizes of the cooling channels and of the walls delimiting them, thereby enabling heat exchange to be optimized while maintaining satisfactory stiffness and low mass.

These objects are achieved by a method of manufacturing a combustion chamber wall having essentially longitudinal channels, in particular for a rocket engine, in which first and second metal sheets are assembled together and welded together and are shaped so as to present corrugations between weld fillets so as to provide passages for a cooling fluid or a heating fluid, the method being characterized in that it comprises the following steps:

[a] making a corrugated metal inner shell by deforming a first plane or tubular sheet;

[b] making a metal outer shell from a second plane or tubular sheet;

[c] assembling the corrugated inner shell and the outer shell together and welding them together locally;

[d] forming an inner coating on the inside face of the corrugated inner shell by the technique of powder metallurgy using a container for the material that is to constitute the inner coating, the outside face of said container being constituted directly by the inside face of said corrugated inner shell and the inside face of said container being made using removable non-consumable sections or a soluble core that is removed by selective chemical dissolving after the inner coating has been formed by applying a hot isostatic compacting cycle; and

[e] forming an outer coating on the outside face of the outer shell.

By forming the corrugations completely on the inner metal shell before it is assembled with the outer metal shell, the method of the invention makes it possible to form cooling channels having a very wide variety of shapes and sizes that can be adapted to optimize heat exchange In particular, it is easy to make cooling channels of changing section, e.g. of smaller section at a nozzle throat.

In addition, the manufacture of a complete combustion chamber is greatly facilitated since the manufacture of an inner shell adapted to the required functions, i.e. having good chemical stability and good resistance to erosion in contact with hot gases, together with good conductivity, can be achieved using the techniques of powder metallurgy, in a manner which is extremely simple since the outside wall of the special container for receiving the powders that are to be compacted is constituted directly by the corrugated inner shell delimiting the cooling or heating channels, i.e. by a portion of the finished product, and since by using the soluble core technique or the technique of a core comprising removable core sections, the inner shell of the container can be made without difficulty.

It may be observed that by using the technology of powder metallurgy it is possible to select metals or metal alloys for the inner coating having good thermal conductivity, even if they are difficult or impossible to machine, since by using the technology of a soluble mandrel or core or the technology of removable sections, it is possible to obtain simple shapes, e.g. a smooth surface, and even complex shapes such as embossing the inner wall to provide small projections, and in particular small corrugations improving heat exchange, and the only additional operations required are simple machining operations for finishing and for the surface state.

According to a particular characteristic of the invention, the outer coating is formed directly on the outside face of the outer shell by plasmaforming using metal or ceramic powder.

Implementing the plasma-forming technique is easy so long as it is not necessary to establish a continuous and metallic keying layer prior to spraying a metal or ceramic plasma since the outer shell provides a continuous metallic surface on its outside face which is capable of withstanding a temperature of about 200° C. for enhancing adherence of the plasma deposit during the spraying operation.

This plasma forming technique makes it possible, in particular, to deposit as an outer coating a layer of alloy or of ceramic whose composition may change within the thickness of said layer of alloy or may be uniform, in particular if using a ceramic, and it may have mechanical characteristics that are suitable for contributing to reducing the thickness of the outer coating, and thus lightening the final product.

In another implementation, the outer coating is formed directly on the outside face of the outer shell by circumferential banding or by winding using a composite material.

The outer coating may also be made by electroplating on the outside wall of the outer shell.

The outer metal shell may be made without corrugations merely by curving the second sheet, or on the contrary it may be made like the inner shell with corrugations produced by deforming the second sheet.

In a particular implementation of the invention, the corrugations of the metal inner shell and of the metal outer shell, if any, are made by shaping the first and second sheets using a hydroforming technique.

In another implementation of the invention, the corrugations of the metal inner shell and of the metal outer shell, if any, are made by a technique of deforming the first and second sheets in the superplastic region.

In yet another implementation of the invention, the corrugations of the metal inner shell and of the metal outer shell, if any, are made by forming the first and second sheets by a stamping or a folding technique.

When the corrugations are made by acting on plane sheets, it is possible to take account, by calculation, of the way in which the sections of the corrugations will be deformed by the subsequent shaping of the inner and outer shells to make them take up the shape of the combustion chamber and by performing the operations of assembly and of welding.

In another variant implementation, the corrugations of the metal inner shell and of the metal outer shell, if any, are made by a technique of deforming the first and second sheets after they have been shaped into the form of circularly symmetrical half-shell components that are delimited by a diametral plane, or in the form of sectors of cylinders, cones, or bullet-shapes.

The corrugated inner shell and the outer shell are assembled together by local welding using one of the following techniques: laser welding; diffusion welding; micro-TIG welding; brazing The dimensions and the surface state of the inside face of the inner coating are finished by at least one of the following techniques: chemical machining and a finishing operation using an abrasive paste under pressure.

The method of the invention is particularly adapted to making combustion chamber wall structures having multiple parallel cooling circuits by implementing a plurality of cooling assemblies constituted by metal shells that are welded together.

Thus, a particular implementation of the manufacturing method of the invention consists in forming and interposing between the outer shell and the outer coating a first additional cooling or heating assembly comprising an additional corrugated metal shell and an additional metal outer shell made and assembled together in accordance with above-mentioned steps [a] to [c] for forming first and second series of alternating additional passages for passing at least one cooling fluid or heating fluid, in further assembling together and locally welding together the additional corrugated inner shell and the outer shell, and in forming the outer coating on the outside face of the additional outer shell instead of on the outside face of the outer shell.

In another particular implementation, the manufacturing method of the invention consists in forming and interposing between the outer shell and the outer coating a plurality of additional cooling or heating assemblies each comprising an additional corrugated metal inner shell and an additional metal outer shell made and assembled together in accordance with above-mentioned steps [a] to [c] to form within each additional cooling or heating assembly first and second alternating series of additional passages for passing at least one cooling fluid or heating fluid, in assembling together and locally welding together [i] the outer shell and the additional corrugated inner shell of the innermost additional cooling or heating assembly and [ii] the additional corrugated inner shell of each of the other additional cooling or heating assemblies and the additional outer shell of the immediately adjacent additional cooling or heating assembly, and in forming the outer coating on the outside face of the additional outer shell of the outermost additional cooling or heating assembly, and not on the outside face of the outer shell.

It is also possible to form corrugations on each additional outer shell prior to assembling it, thereby constituting a honeycomb structure of additional cooling or heating passages.

BRIEF DESCRIPTION OF THE DRAWINGS

Other characteristics and advantages of the invention appear from the following detailed description of particular implementations given by way of example and with reference to the accompanying drawings, in which:

FIG. 1 is a diagrammatic axial section view of a portion of a combustion chamber made in accordance with the invention;

FIG. 2 is a section view on plane A—A of FIG. 1 through a portion of the wall of the FIG. 1 combustion chamber made in accordance with a first particular implementation to have a corrugated inner shell and a smooth outer shell;

FIG. 3 is a section view on plane A—A of FIG. 1 through a portion of the wall of the FIG. 1 combustion chamber made in accordance with a second particular implementation to have a corrugated inner shell and a corrugated outer shell;

FIG. 4 is an enlarged view of a portion of FIG. 2;

FIG. 5 is a section view analogous to FIG. 4 but showing an example of a combustion chamber wall having two successive pairs of shells stacked together to define a plurality of cooling channels;

FIG. 6 is a section view analogous to FIG. 4 but showing an example of a combustion chamber wall comprising three successive pairs of shells stacked together to define an even larger number of cooling channel circuits;

FIG. 7 is a section view analogous to FIG. 6 that shows an example of a combustion chamber wall comprising three successive pairs of shells that are stacked together and all of which are corrugated so as to define a honeycomb structure of cooling channels;

FIGS. 8 to 20 are sections analogous to those of FIGS. 2 and 3 but without the inner and outer coatings showing portions of assembled-together inner and outer shells usable in a combustion chamber wall of the invention and presenting a wide range of shapes;

FIG. 21 is a section view on plane XXI—XXI of FIG. 22 showing a portion of a combustion chamber wall of the invention during its manufacture on an internal mandrel; and FIG. 22 is an axial half-section through the FIG. 21 combustion chamber wall during manufacture on an inner mandrel.

DETAILED DESCRIPTION OF PARTICULAR IMPLEMENTATIONS

FIG. 1 shows a portion of the combustion chamber, of a rocket engine having a nozzle-shaped portion with a narrow portion or throat 10. The wall of the combustion chamber includes channels 7 for conveying a coolant which may be one of the fuel components used to feed the combustion chamber and stored at low temperature.

The wall of the combustion chamber has an outer coating 5 with an outside face 6, and it may be made in particular by plasma-forming or by binding using composite materials or ceramics, or by electroplating a metal, and an inner coating 3 having an inside face 4, and made using the technology of metallurgy with metallic or non-metallic powders.

The inside face 4 of the inner coating 3 may be smooth, or is preferably embossed to facilitate heat exchange.

It is particularly important to choose an appropriate material to constitute the inner coating 3 since this coating is subjected to a flow of gas at high temperature, at about 3000 K. The material of the inner coating 3 must thus present excellent thermal conductivity in order to ensure very good heat exchange, and excellent strength relative to the gases being ejected.

The method of the present invention which enables the inner coating 3 to be made conveniently using the technology of powder metallurgy makes it possible to choose a material, a pure metal or an alloy, or a mixture of ceramic materials, while taking particular account of these criteria of conductivity, chemical stability, and resistance to erosion when subjected to hot gases, and makes it possible to choose materials that are difficult to machine, for example, and that would normally be unacceptable for use in manufacturing combustion chambers.

Using the technology of powder metallurgy to make the inner coating 3 is advantageous, in particular, for making porous walls and for making parts of small or medium size having complex shapes that are difficult to machine.

As is well known, the technology of powder metallurgy requires special containers to be made. The manufacturing method of the invention makes it possible to escape from this constraint by using a container portion that is constituted directly by a portion of the finished product as constituted by the wall of the combustion chamber, i.e. one of the two shells delimiting the cooling channels.

The method of manufacturing a wall or a wall component in accordance with the invention will be better understood with reference to FIGS. 2 to 4 which show the structure of a wall, and in particular the structure of the items defining the channels 7.

According to the invention, channel machining is avoided, and the cooling or heating circuit assembly incorporated in the wall is made as a single piece by sheets which are assembled together by welding or brazing.

A first base sheet is initially shaped by hydroforming and/or by super-plastic deformation, stamping, or folding to constitute an inner shell 1 provided with corrugations 11 and 12.

A second base sheet which may be plane or tubular can be shaped in the same manner to constitute a corrugated outer shell 2' (FIG. 3), or it may merely be rolled to form a smooth outer shell 2 (FIGS. 2 and 4).

The two shaped sheets are then brought into contact with each other and welded or brazed together along weld zones 8 extending longitudinally between the empty spaces defining the channels 7.

By using sheet to constitute the cooling channels 7, it is possible to choose materials that have excellent characteristics, and in particular properties enabling them to be deformed in the superplastic region.

The thickness of the sheet used for making the inner shell 1 can easily be optimized to provide a good compromise between the heat exchange capacity and the mechanical strength of the material chosen for the sheet delimiting the channels and the material chosen for the inner coating 3, which material contributes to the stiffness of the assembly.

Once superposed and put into contact, the inner and outer shells 1 and 2 may be welded together, for example by laser welding or by micro-tungsten-inert-gas (TIG) welding using a refractory electrode and facilitating welding of thin metal sheet. However other welding techniques may be used, such as diffusion welding or brazing.

The inner and outer shells 1 and 2 may be made of the same metal material or, on the contrary, they may be made of two different metal materials, e.g. a bimetallic sheet or a sheet coated with a deposit, depending on the intended application.

Corrugations can be formed in plane sheets by stamping, in general the way in which the cross-sections of the channels 7 will be deformed as a result of the corrugated plates 1 and 2' being shaped to form a circularly symmetrical structure can be calculated in advance so that it is possible to make channels whose shapes and sizes are accurate and in particular to ensure that the cooling channels 7 can be made with sections that vary.

However, it is also possible to form the corrugations 11 and 12 in the inner shell 1 or the corrugations 21 and 22 in the outer shell 2' after these parts have been shaped to constitute half-shells delimited by a diametral plane, or cylindrical sectors, or conical sectors, or sectors of a bullet-shape corresponding to the final shape of the combustion chamber.

While welding together the inner and outer shells 1 and 2 or 2', it is not essential to provide reliable sealing between adjacent channels 7 so long as only one type of cooling liquid or heating liquid is used in the heat exchanger circuit as a whole. However, the invention also makes it possible to implement at least two different fluids in two different networks of channels as described below with reference to FIGS. 5 to 7. Under such circumstances, reliable sealing must be provided along the weld fillets.

Manifolds for feeding and removing coolant (not shown in the drawings) are welded directly to the shells 1, 2, or 2' that delimit the channels and also contribute to increasing the stiffness of the assembly.

The outer coating 5 of the combustion chamber may be formed simply, e.g. by plasmaforming.

Plasmaforming can be applied directly to the product because the technique whereby the channels 7 are made offers a continuous metallic surface on the outside portion of the outer shell 2, 2' that is suitable for withstanding the temperatures of about 200° C. that are necessary for enhancing the adhesion of the plasma deposit during the spraying operation. In such a context, there is no need to create a special continuous metallic keying layer prior to plasma spraying, as would be necessary with a wall in which the cooling channels were made by machining.

The outer coating 5 may also be constituted by a layer of alloy whose composition varies within the thickness of the layer, thereby making it possible to reduce the overall thickness of the outer coating 5 and to lighten the final product.

While the inner coating 3 is being made by the technology of powder metallurgy, the outer container is constituted directly by the inner corrugated shell 1 and the inner container is constituted by a soluble core or mandrel or by removable sections. The inner coating can thus easily be applied to the inner shell 1 and can be caused to adhere thereto after applying a hot isostatic compacting cycle.

As shown in FIGS. 2 and 4, in particular, the thickness of the inner coating 3 may be reduced where it overlies the channels 7, thereby facilitating heat exchange, and may be as little as 0.8 mm in its longitudinal regions that overlie the channels 7 directly, while being greater in its regions which overlie the furrows defined by the portions 11 of the corrugations in the shell 1, where the thickness of the coating may be several centimeters, e.g. 5 cm.

The inner coating 3 may be obtained by porous sintering, thereby improving heat exchange, providing the nature of the fluid that penetrates into the inner coating 3 is compatible with the nature of the sheets constituting the shells 1 and 2.

The inside face 4 of the inner coating 3 may be smooth and uniform (FIG. 6) or it may be corrugated, as shown in FIGS. 2 to 5 and 7, thereby increasing heat exchange.

In general, the manufacturing method of the invention makes it possible to choose over a very wide range of materials both for constituting the inner coating 3 and for constituting the outer coating 5.

The inner container that is used temporarily while making the inner coating 3 and which serves essentially to define the shape of the inside face 4 is made using the soluble core technique, i.e. it is removed by selective chemical dissolving, or else by the removable section technique, thereby baring the material chosen for making the inner coating 3. These technologies are suitable both for obtaining shapes that are simple and smooth and for obtaining shapes that are complex, e.g. embossed, and which would be difficult to achieve by conventional machining.

Chemical machining and/or a finishing operation by means of an abrasive paste under pressure can be used for finishing the dimensions and the surface state of the inside face 4 of the inner coating 3. During a finishing operation using an abrasive paste under pressure, the paste flows over the workpiece backwards and forwards in two opposite directions because of two pistons placed on opposite sides of the workpiece. If necessary, the workpiece is enclosed in a sealed box.

The outer coating 5 which is formed directly on the outer shell 2, 2' which may itself be uniform (FIG. 2) or corrugated (FIG. 3) may be made by techniques other than plasmaforming. Thus, in a variant, the outer coating 2, 2' may be made by circumferential banding or by winding using a composite material, or else it may be made by electroplating.

By way of example, the sheets used for making the shells 1, 2, 2' may be made of Inconel 625 and may be about 0.15 mm to 0.2 mm thick.

The thickness of the outer coating 5 may lie in the range 2 mm to 4 mm, for example.

The corrugations in the shells 1 and 2' may, for example, be about 3 mm deep and about 1.5 mm wide, however dimensions may be selected over a relatively wide range of values and in large assemblies they may reach several centimeters.

In the embodiment of FIG. 3, in which both the inner and the outer shells 1 and 2' are corrugated, the corrugations may naturally be half as deep as in the embodiment of FIG. 2 where only the inner shell 1 is corrugated.

Particular embodiments are described below with reference to FIGS. 5 to 7, which embodiments have a plurality of heat exchange circuits implemented by the method of the invention and stacked between the inner coating 3 and the outer coating 5.

FIG. 5 shows a wall portion in which an additional cooling or heating assembly is interposed between the outer shell 2 and the outer coating 5, with the additional assembly being constituted by assembling together an additional corrugated inner metal shell 101 whose shape may be identical to the shape of the inner shell 1, or otherwise, and an additional outer metal shell 102 whose shape may be identical to that of the outer shell 2, or otherwise. The additional shells 101 and 102 may be manufactured using the same technique as the shells 1 and 2. However, on assembly, it is naturally possible to proceed by welding the shells together successively, either in the order 1, 2, 101, and 102, or else in the order 102, 101, 2, and 1. The inner coating 3 and the outer coating 5 are formed respectively on the inner shell 1 and on the additional outer shell 102 as in the embodiments of FIGS. 2 to 4.

FIG. 5 shows the inner shells 1 and 101 as being corrugated with curved portions 11 & 12, and 111 & 112, while the outer shells 2 and 102 are uniformly curved, but they too could naturally be corrugated.

The additional shells 101 and 102 define alternating first and second series of additional passages 107 and 109 which may be used to convey two distinct fluids L1 and L2, or a single type of fluid only.

The number of pairs of shells that are stacked together to define cooling or heating channels may be greater than two. Thus, FIGS. 6 and 7 show combustion chamber walls having multiple parallel cooling circuits 100, 200 comprising three pairs of inner and outer shells 1, 2 or 2'; 101, 102 or 102'; and 201, 202 or 202' formed from plane sheet and assembled together by welding in the manner described above.

The additional outer shells 102, 202 or 102', 202' may be entirely analogous to the uniform outer shell 2 or to the corrugated outer shell 2' as described above, and, when they are corrugated, the shells 102', 202' (FIG. 7) may have successive furrow portions facing in opposite directions 121, 122; 221, 222. Similarly, the additional inner shells 101, 201 may be entirely analogous to the above-described inner shells 1 with successive furrow portions facing in opposite directions 111, 112; 211, 212. The channels 7, 107, 207 may convey a first cooling liquid or heating liquid L1 and the channels 109, 209 may convey a second cooling or heating liquid L2, providing the weld fillets 8, 108, 208 between the various shells are made in fluid-tight manner, however it is also possible to use a single type of liquid L2 only. It is also possible to leave some of the channels empty, e.g. channels 109, 209.

Further, in the various embodiments described, it is possible to replace all or some of the channels 7, 107, 207, 109, 209 formed between the various shells 1, 2, 2', 101, 102, 102', 201, 202, 202' with grains or powders that generate catalytic reactions in the cooling fluid or heating fluid, so as to increase heat exchange.

FIGS. 21 and 22 show more particularly a step in the method of the invention during which an inner coating 3 is formed on the inside face of the corrugated inner shell 1 using the technique of powder metallurgy with a container for the powder material that is to constitute the inner coating 3, said inner coating being formed by applying a hot isostatic compacting cycle.

The outer wall of the container is constituted directly by the inner shell or sheet 1 whereas the inner wall 50 of the container is constituted by a removable non-consumable core section which is recovered after each hot isostatic compacting operation, or else by a soluble core or mandrel, i.e. by a non-recoverable component which is chemically dissolved after a hot isostatic compacting operation.

In FIGS. 21 and 22, the axis of the combustion chamber is referenced 60. The working portion of the chamber is of length L2 defined between two section planes D1 and D2 on which a cutting-out operation is performed after the inner coating 3 has been formed. During the hot isostatic compacting operation, the container thus defines an extra head length L1 and an extra foot length L3. The metal sheets constituting the inner and outer shells 1 and 2' of the wall to be manufactured are folded over the end transverse faces of the section-forming or mandrel-forming component 50 and they are welded to this component 50 in weld zones 91 and 92.

In FIGS. 22 and 22, arrows 8 represent the isostatic pressure which is exerted on the compacting enclosure during the hot isostatic compacting operation. This pressure P acts both on the inside face 51 of the component 50 and on the sheets constituting the shells 1 and 2'.

At least one hole 93 is formed through the outer shell 2' to communicate with each channel 7 so that only the inner shell 1 is subjected to deformation when the pressure P is applied to compact the inner coating 3 made up of powder, given that the outer shell 2' cannot collapse on the inner shell 1 because of pressure equilibrium between the inside of each passage 7 and the outside face of the outer shell 2'.

Examples of materials that are suitable for making the inner coating 3 using powder metallurgy include copper; silver; a mixture of copper and silver; a mixture of metal powders comprising copper, nickel, and tungsten, for example, with a dispersion of oxides such as $YO_2$, $SiO_2$, $Al_2O_3$; tungsten; platinum; nickel and nickel-based alloys such as N18, Astroloy, inco 625, inco 718; and ceramics.

Materials suitable for making the outer coating 5 by plasmaforming include the following, for example: titanium and alloys thereof; nickel and alloys thereof; and alloys of the type M Cr Al Y or M Co Cr Al Y, where M designates nickel or cobalt.

When circumferential banding is used, it may be performed with composite materials such as SiC, or carbon-carbon, or it may be constituted by windings of impregnated fibers.

A wide range of metal materials can be chosen for the sheets constituting the inner and outer shells 1, 2, 2' and also for the possible additional shells 101, 201, 102, 202, 102', 202'.

Examples of suitable alloys that may present superplastic behavior include the following:

copper alloys such as Cu-(7 to 10)P, presenting superplastic behavior in the range 683° C. to 873° C.;

nickel alloys such as Ni-34.9Cr-26.2Fe-0.58Ti presenting superplastic behavior in the range 1068° C. to 1128° C.;

titanium alloys such as Ti-8Mn having superplastic behavior in the range 853° C. to 1173° C.;

Co-10Al having superplastic behavior around 1473° C.;

Zr-2.5Nb having superplastic behavior in the range 900° C. to 1100° C.; and

W-(15 to 30)Re, having superplastic behavior around 2273° C.

The various shells 1, 2, 2', 101, 102, 202, 102', 202' for defining the various fluid flow channels 7, 107, 207, 109, 209 after they have been shaped and assembled together e.g. by welding or brazing in the regions 8 may have a wide variety of shapes. Various possible configurations are shown in FIGS. 8 to 20, which are based by way of example on a single assembly of an inner shell 1 and an outer shell 2 or 2'. Naturally the configurations shown may be applied in the same manner to two additional shells such as 101, 102 or 102', for example.

FIGS. 8, 9, and 20 show corrugations having trapezium-shaped sections, FIGS. 10, 17, and 18 show corrugations having curved sections, FIGS. 11 and 12 show corrugations having triangular sections, FIGS. 13, 14, and 19 show corrugations having rectangular sections, FIGS. 15 and 16 show corrugations having a mixture of different types of section, e.g. alternating curved corrugations and corrugations having sections that are rectangular or trapezium-shaped, and FIGS. 19 and 20 show corrugations having sections with the same kind of shape (rectangular and trapezium-shaped, respectively) but different sizes. The various configurations shown are naturally not limiting.

I claim:

1. A method of manufacturing a combustion chamber wall having essentially longitudinal channels, in particular for a rocket engine, comprising the steps of:
   (a) making a corrugated metal inner shell by deforming a first plane or tubular metal sheet;
   (b) making a metal outer shell having an inside face and an outside face from a second plane or tubular metal sheet;
   (c) assembling the pre-shaped corrugated inner shell and the pre-shaped outer shell together and welding them together by weld fillets along predetermined substantially longitudinal regions, thereby creating in the single step of welding, finished channels for a cooling fluid or a heating fluid;
   (d) forming an inner coating on the inside face of the corrugated inner shell by the technique of powder metallurgy using a container having an inside wall and an outside wall, the container receiving a powder material that is to be subjected to a hot isostatic compacting cycle to constitute the inner coating, the outside wall of said container being made using removable non-consumable sections or a soluble core that is removed by selective chemical dissolving after the inner coating has been formed by applying said hot isostatic compacting cycle; and
   (e) forming an outer coating in one piece on the outside face of the outer shell.

2. A method according to claim 1, wherein the outer coating is formed directly on the outside face of the outer shell by plasmaforming using metal or ceramic powder.

3. A method according to claim 2, wherein the outer coating deposited by plasmaforming is constituted by a layer of alloy whose composition varies within the thickness of said layer of alloy.

4. A method according to claim 1, wherein the metal outer shell is made without corrugations merely by curving said second sheet.

5. A method according to claim 1, wherein a metal outer shell having corrugations is made by deforming said second sheet.

6. A method according to claim 1, wherein the corrugations of the metal inner shell and of the metal outer shell, if any, are made by shaping the first and second sheets using a hydroforming technique.

7. A method according to claim 1, wherein the corrugations of the metal inner shell and of the metal outer shell, if any, are made by a technique of deforming the first and second sheets in the superplastic region.

8. A method according to claim 1, wherein the corrugations of the metal inner shell and of the metal outer shell, if any, are made by forming the first and second sheets by a technique of stamping or folding.

9. A method according to claim 1, wherein the corrugations of the metal inner shell and of the metal outer shell, if any, are made by a technique of deforming the first and second sheets after they have been shaped into the form of circularly symmetrical half-shell components that are delimited by a diametral plane, or in the form of sectors of cylinders, cones, or bullet-shapes.

10. A method according to claim 1, wherein the corrugated inner shell and the outer shell are assembled together by welding using one of the following techniques: laser welding; diffusion welding; micro-TIG welding; brazing.

11. A method according to claim 1, wherein an inside face that is embossed, corrugated, or smooth is formed on the inner coating by powder metallurgy using the technique of a soluble core or the technique of removable sections.

12. A method according to claim 1, wherein the dimensions and the surface state of the inside face of the inner coating are finished by at least one of the following techniques: chemical machining and a finishing operation using an abrasive paste under pressure.

13. A method according to claim 1, wherein the outer coating is formed directly on the outside face of the outer shell by circumferential banding or by winding using a composite material.

14. A method according to claim 1, wherein the outer coating is formed directly on the outside face of the outer shell by electroplating.

15. A method according to claim 1, further consisting in forming and interposing between the outer shell and the outer coating a first additional cooling or heating assembly comprising an additional corrugated metal shell and an additional metal outer shell made and assembled together in accordance with above-mentioned steps [a] to [c] for forming first and second series of alternating additional passages for passing at least one cooling fluid or heating fluid, in further assembling together and locally welding together the additional corrugated inner shell and the outer shell, and in forming the outer coating on the outside face of the additional outer shell instead of on the outside face of the outer shell.

16. A method according to claim 1, further consisting in forming and interposing between the outer shell and the outer coating a plurality of additional cooling or heating assemblies each comprising an additional corrugated metal inner shell and an additional metal outer shell made and assembled together in accordance with above-mentioned steps [a] to [c] to form within each additional cooling or heating assembly first and second alternating series of additional passages for passing at least one cooling fluid or heating fluid, in assembling together and locally welding together [i] the outer shell and the additional corrugated inner shell of the innermost additional cooling or heating assembly and [ii] the additional corrugated inner shell of each of the other additional cooling or heating assemblies and the additional outer shell of the immediately adjacent additional cooling or heating assembly, and in forming the outer coating on the outside face of the additional outer shell of the outermost additional cooling or heating assembly, and not on the outside face of the outer shell.

17. A method according to claim 15, wherein corrugations are additionally formed on each additional outer shell prior to assembling it, thereby constituting a honeycomb structure of additional cooling or heating passages.

18. A method according to claim 16, wherein corrugations are additionally formed on each additional outer shell prior to assembling it, thereby constituting a honeycomb structure of additional cooling or heating passages.

19. A method according to claim 1, wherein at least some of the passages formed between the inner and outer shells and the additional inner and outer shells, if any, are filled with grains or powders that generate catalytic reactions in the cooling or heating fluid.

20. A combustion chamber obtained by the method according to claim 1.

21. The method according to claim 1, wherein the outer coating has a thickness lying in the range of two millimeters to four millimeters.

* * * * *

UNITED STATES PATENT AND TRADEMARK OFFICE
CERTIFICATE OF CORRECTION

PATENT NO. : 5,233,755
DATED : August 10, 1993
INVENTOR(S) : Georges Vandendriessche It is certified that error appears in the above-indentified patent and that said Letters Patent is hereby corrected as shown below:

Column 3, line 13, "exchange" should read --exchange.--.

Column 4, line 36, "brazing" should read --brazing.--.

Column 5, line 30, "A-A" should read --1-1--.

Column 5, line 35, "A-A" should read --1-1--.

Column 5, line 62, "XXI-XXI" should read --22-22--.

Signed and Sealed this

Second Day of August, 1994

*Attest:*

BRUCE LEHMAN

*Attesting Officer*  Commissioner of Patents and Trademarks